May 10, 1932.    W. MILLER ET AL    1,857,253
SPRAG FOR MOTOR VEHICLES AND THE LIKE
Filed April 6, 1929
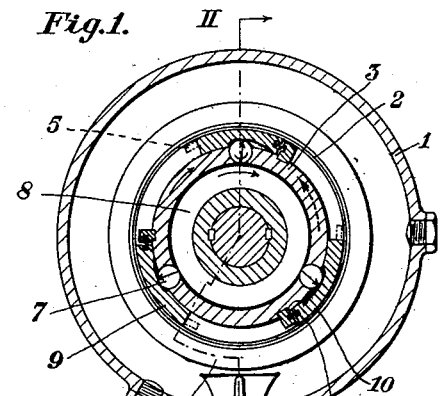
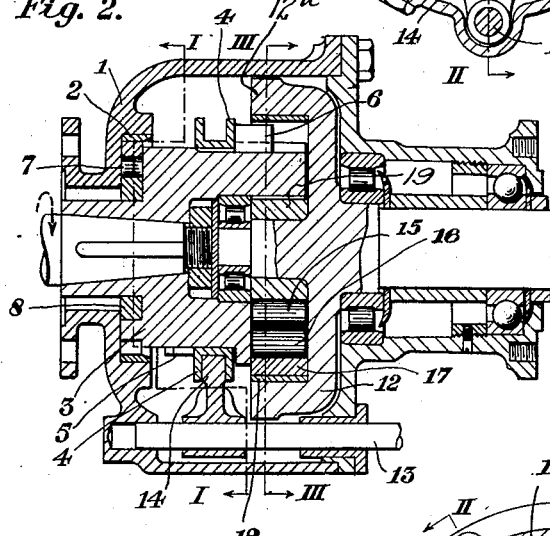
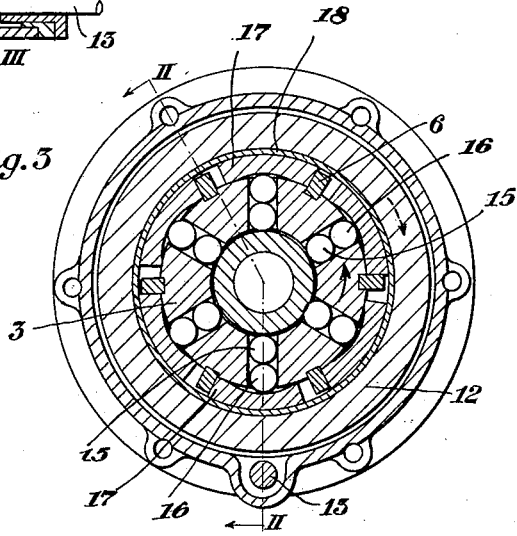
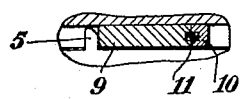
Inventors:
Wm. Miller.
Harold T. Lamb.
By.
Attorney.

Patented May 10, 1932

1,857,253

UNITED STATES PATENT OFFICE

WILLIAM MILLER, OF DUNSTON-ON-TYNE, AND HAROLD THOMAS LAMB, OF NEWCASTLE-ON-TYNE, ENGLAND

SPRAG FOR MOTOR VEHICLES AND THE LIKE

Application filed April 6, 1929, Serial No. 353,025, and in Great Britain April 21, 1928.

This invention consists in an improved sprag for motor vehicles and the like for preventing unintentional running backwards of the vehicle, and has for its object to provide an improved spragging device comprising a ball or roller clutch, while another object is to provide means for rendering the clutch operative or inoperative at will. A further object of the invention is to provide a spragging device to operate in conjunction with a free-wheel device, so that when the free-wheel clutch is rendered inoperative, that is to say bi-directional, the spragging device is also rendered inoperative, this condition of affairs being required, for example, when the reverse gear is engaged to cause the vehicle to run backwards.

According to the invention the clutch engaging means of the device comprise a single acting wedge cooperating with each rolling unit (hereinafter referred to as "roller") and a fixed stop on one of the clutch members adapted to abut against the wide end of a wedge, the stops being located so that when they abut against the wedges the latter are out of engagement with the rollers.

To render the device inoperative slidable stops are provided on the clutch member with the stationary stops, the said slidable stops being slidable into the path of the wedges so that the narrow ends of the latter abut against the said stops and prevent engagement between the wedges and rollers. One of the clutch members is rigidly secured to one of the vehicle members, preferably the rear portion of the gear box casing, while the other member is secured to the transmission shaft, the sliding stops being secured to a common operating member such as the grooved collar on the free-wheel clutch above referred to.

According to one form of construction of the invention a ball or roller clutch is used of any of the kinds used in a free-wheel clutch with the exception that the wedges are single acting and at their wide ends abut against fixed stops on the roller containing member, which stops are located so that when they abut against the wedges these are out of engagement with the rollers, the narrow ends of the wedges being adapted to abut against the sliding stops.

To combine the sprag clutch with the freewheel clutch, the rotating clutch member is rigidly connected to one of the free-wheel clutch members, the other free-wheel clutch member being secured to the rearward transmission shaft, while a common operating member is provided, preferably between the two clutches, for operating the slidable stops of both clutches, the arrangement being such that when one set of stops is in position to engage with its wedge the other set of stops is out of engagement.

The invention will now be described with reference to the accompanying drawings which show a form of construction of combined sprag and free-wheel clutch. In the said drawings:

Fig. 1 is an elevation in cross section taken on the line I—I of

Fig. 2, which is a longitudinal elevation taken on the lines II—II of Figs. 1 and 3 respectively, and Fig. 3 is an elevation in cross section taken on the line III—III of Fig. 2.

Fig. 4 is a fragmentary view showing the development of the wedge and stop system.

Referring more particularly to the drawings, 1 indicates the sprag clutch casing which is secured to the rear portion of a gear box, and 2 is a hardened steel liner rigid with the casing 1 and forms with the casing the one clutch member. The inner or roller carrying members of both clutches are made in one piece 3, a space being left between the two members to receive a grooved collar 4 to each side of which are secured the ends of slidable stops. The stops for the sprag clutch are indicated at 5, and those for the free-wheel clutch at 6. The outer free-wheel clutch member 12 is secured to the rearward transmission shaft.

Dealing first with the sprag clutch, the roller carrying member 3 is slotted to carry three single rollers 7, and at this portion is of reduced diameter, while an extension of the said member 3 carries a ring 8 rotatably mounted thereon, the said ring contacting with the rollers 7. Single acting wedges 9 coact with the rollers 7, and in the one direction are adapted to abut against stationary stops 10 rigid with the member 3, a spring 11 being interposed between each wedge and stop to maintain the former in contact with the roller 7.

Dealing now with the free-wheel clutch, the member 3 is also slotted to carry pairs of rollers 15, 16, each pair of which coacts with a double acting wedge 17. The outer face of the wedge 17 is segmental and is in sliding contact with the inner face of a liner 18 on a flange 12a formed on the member 12. The inner rollers 15 contact with a bush 19 which is keyed to the member 12. When the stops 6 are in the position shown in Fig. 2 the clutch is in the forward drive position so that free wheeling is possible. When the vehicle free wheels the member 12, turning in the direction of the dotted arrow in Fig. 3, causes the wedges 17 to abut against the stops 6 so that the mid-portions of the wedges come opposite the rollers 15, 16, and there is no engagement between the clutch members.

When it is desired to drive the vehicle backwards, the sprag clutch will have to be rendered inoperative, while the free-wheel feature of the free-wheel clutch will have to be cut out and the free-wheel clutch rendered bi-directional to transmit the drive to the wheels. To effect this, the collar 4 is moved to the left by means of the striking rod 13 and bridle 14 until the stops 5 come into the path of the wedges 9 as indicated in chain lines in Fig. 1, which movement simultaneously withdraws the stops 6 out of the path of the wedges 17.

With the stops 5 and 6 in this position, when the member 3 is made to rotate in the reverse direction as indicated by the full arrows, the sprag stops 5 prevent the wedges 9 from lagging and so retain them with their narrow portions opposite the rollers 7, so that no engagement takes place; while the withdrawal of the free wheel clutch stops 6, allows the wedges 17 to lag and so cause the rollers 15 and 16 to coact therewith and effect engagement of the clutch members so that the reverse drive is effectively transmitted.

The action of the clutch is as follows:— When the vehicle is to be driven in a forward direction with the sprag and free wheel clutches functioning, the slidable stops 5 are withdrawn from the sprag clutch, which is thus rendered operative, and hence the stops 6 inserted in the free wheel clutch. On the member 3 moving in a forward direction as indicated by the dotted arrows, the fixed stops 10 of the sprag clutch carry round the wedges 9, while the stationary member 1 causes the said wedges to lag and take up the position indicated in Fig. 1, so that no pressure is exerted between the rollers 7 and the ring 8, and no engagement occurs between the clutch members. When the vehicle tends to move backwards, the member 12 rotates in the direction of the solid arrows carrying with it the free wheel wedges 17 which thus coact with the rollers 15, 16 to engage the member 3. The sprag clutch wedges 9 therefore lag behind, and the rollers 7 engage the wedge surfaces, the spring 11 causing immediate engagement. Hence a pressure is set up between the rollers 7 and the wedges 9 on the one hand and the rollers 7 and the ring 8 on the other hand. The ring 8 as a result turns in the direction of the arrow indicated therein, and tends further to promote engagement of the clutch members, so that the clutch is effectively engaged.

It will be noted that the spragging device cannot be rendered inoperative while it is functioning, as the wedges will have come in front of the ends of the slidable stops 5 and so prevent their movement. Further the device cannot be rendered operative while functioning in the inoperative setting owing to the wedges pressing against the slidable stops 5 and thus holding them against movement.

Again, the recesses in the roller carrying member 3 may have their sides curved as shown to correspond with the shape of the rollers, a very small clearance being left to allow of free movement of the rollers in their recesses when the clutch comes into action. This is to prevent the rollers moving outwards under centrifugal action, and exerting a pressure on the wedges when the vehicle is running in the forward direction. Instead of having the sides of the roller recesses of curved section they may be straight with their outer edges lipped over.

We claim:

1. A spragging device for motor vehicles and the like which includes a roller friction clutch comprising two members one of which is held stationary, clutch engaging means between the two clutch members, said clutch engaging means comprising a single acting wedge adapted to coact with each roller unit when the normal direction of rotation is reversed, slidable stops on the one clutch member adapted to be slid into the path of the wedges so that on the normal direction of drive being reversed the narrow ends of the said wedges abut against the said slidable stops and prevent engagement between the wedges and rollers, in combination with a free-wheel device which includes rollers coacting with wedging means having oppositely disposed wedge faces, and slidable stops adapted to be brought into and out of the path of the wedging means so as to render one of the wedge faces of each wedging means inoperative or operative, a common operating member between the said spragging and free wheel devices, to which are secured the slidable stops of both clutches, the arrangement being such that when the one set of stops is in the operative position the other set is in the inoperative position.

2. A combined spragging and free-wheel device according to claim 1, a grooved collar between the said clutch devices, to which are secured the slidable stops of both clutches, the arrangement being such that when the one set of stops is in the operative position the other set is in the inoperative position.

3. A combined spragging and free-wheel device according to claim 1, the rotating member of the sprag clutch being rigidly connected to one of the free-wheel clutch members.

4. A combined spragging and free-wheel device according to claim 1, the rotating member of the sprag clutch being rigidly connected to the inner member of the free-wheel clutch.

In witness whereof we have signed this specification.

WM. MILLER.
HAROLD T. LAMB.